United States Patent [19]
Doucette et al.

[11] Patent Number: 6,108,346
[45] Date of Patent: Aug. 22, 2000

[54] COMBINED SYNCHRONOUS AND ASYNCHRONOUS MESSAGE TRANSMISSION

[75] Inventors: John Doucette, Londonderry; Thomas J. Bryden, Peterborough; Todd Byron, Manchester, all of N.H.

[73] Assignee: Xiox Corporation, Burlingame, Calif.

[21] Appl. No.: 09/268,099

[22] Filed: Mar. 13, 1999

Related U.S. Application Data

[60] Provisional application No. 60/098,297, Aug. 27, 1998.
[51] Int. Cl.$^7$ .................................................. H04L 12/403
[52] U.S. Cl. ........................... 370/450; 370/353; 370/468
[58] Field of Search ...................... 370/352, 353, 370/354, 452, 460, 450, 468, 909, 470, 471, 472, 473, 476; 709/251, 238

[56] References Cited

U.S. PATENT DOCUMENTS

| | | | |
|---|---|---|---|
| 5,392,280 | 2/1995 | Zheng | 370/60 |
| 5,570,355 | 10/1996 | Dial et al. | 370/352 |
| 5,935,214 | 9/1999 | Stiegler et al. | 709/251 |

*Primary Examiner*—Huy D. Vu
*Assistant Examiner*—Kevin C. Harper
*Attorney, Agent, or Firm*—Elmer Galbi

[57] ABSTRACT

A communication system including a collection of modules coupled in a ring architecture which integrates synchronous and asynchronous message transmission. Asynchronous data packets and synchronous voice packets are exchange on a single communication link. Packetized information exchange references a fixed length window with all synchronous data being exchanged at the beginning of each window and with asynchronous data exchanged during the remaining portion of each window. Virtual circuits utilizing the synchronous packets can deliver telephone conversations without degradation in voice quality and yet the system can also transmit asynchronous data packets.

2 Claims, 5 Drawing Sheets

COMBINED SYNCHRONOUS AND ASYNCHRONOUS MESSAGE TRANSMISSION

RELATED APPLICATION

The present invention is a continuation-in-part of application Ser. No. 60/098,297 filed Aug. 27, 1998 entitled "Combined Synchronous and Asynchronous Message Transmission."

BACKGROUND OF THE INVENTION

Packet switching systems transmit data by breaking the data into relatively small manageable pieces called packets. Packet switching can be used to transmit data in both computer networks and in telephone voice networks. Telephone packet switching networks transmit a series of packets over the same route in the network. Such systems in effect establish a virtual circuit from the point where a series of packets enters the network to the point where the packets are delivered. Packet switching networks establish virtual circuits through the network in order to transmit voice without delay and distortion.

Protocols such as the Internet ITPC protocol can transmit voice without establishing a virtual circuit connection, however, voice transmission using this type of protocol generally has less quality than voice transmitted using protocols which establish virtual circuits between the input point and the output point in the network.

Today, some voice transmissions are being made over packet protocols (such as the Internet) which do not establish virtual circuits. Voice connections over such circuits are of relatively low quality. The packet protocols which are used in the public telephone network are packet protocols which establish virtual circuits and which transmit all the packets that constitute a conversation over the same route through the network. Thus they provide high quality connections.

Data communication protocols can be characterized as either synchronous or asynchronous. Examples of widely used synchronous protocols are the X.25 protocol, and the frame relay protocol. Examples of widely used asynchronous protocols are the Ethernet, FDDI and ATM protocols. The X.25 protocol, the frame relay protocol and the ATM protocol are widely used in telephone systems. The Ethernet protocol and the FDDI ring protocol are widely used in local area networks (LANS) and wide area networks (WANS) that are used to interconnect computer systems.

There are various well known techniques for controlling asynchronous networks. One technique termed "carrier sense, multiple access with collision detection (CSMA/CD) is used in Ethernet networks. Another technique called token passing is used in FDDI ring networks.

Explanations of various synchronous and asynchronous protocols, and an explanation of CSMA/CD and FDDI ring networks is for example given in a book entitled "Voice and Data Communications Handbook" by Regis J. Bates and Donald Gregory which is published by McGraw Hill.

SUMMARY OF THE INVENTION

The present invention provides a ring protocol and system that combines synchronous and asynchronous transmission techniques. The ring can interconnect a number of modules and be utilized to transmit both fixed and variable packets between the modules. Communication time is broken into a sequence of fixed length windows. At the beginning of each window the modules communicate using a synchronous protocol. That is, at the beginning of each window, if any unit has synchronous traffic, such traffic is transmitted using a synchronous ring protocol and fixed length packets. Virtual circuits can be established between the modules using the synchronous fixed length packets communicated at the beginning of each window. When it is desired to establish a virtual circuit between any of the modules in the ring, each module is assured that at the beginning of each window, space will be allocated to transmit a synchronous fixed length packet to another module in the ring. The windows occur frequently enough that a virtual voice grade circuit can be established between the modules. After all synchronous packets required during any window have been transmitted, asynchronous variable length data packets are transmitted around the ring. Limits are provided relative to the number of asynchronous packets any one module can transmit, thereby avoiding monopolization of the ring by any one module. The modules are synchronized by a periodically circulating a timing control character around the ring.

BRIEF DESCRIPTION OF THE DRAWINGS

FIG. 6 is a flow chart showing the operation of modules of FIG. 1 when receiving and processing information exchanged there-between.

DETAILED DESCRIPTION OF THE PREFERRED EMBODIMENT

Figure 1:
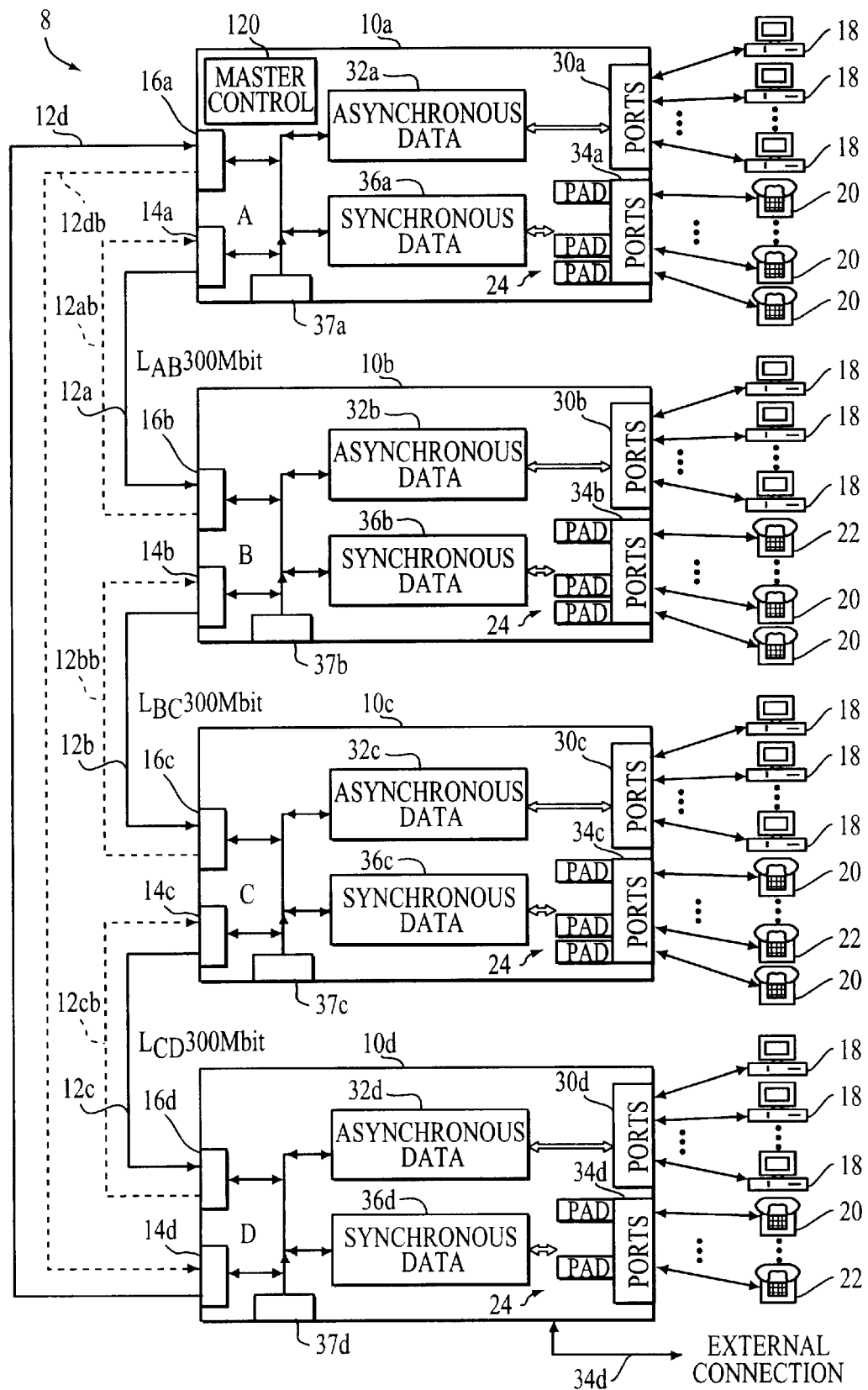
FIG. 1 is an overall block diagram of the preferred embodiment.

A preferred embodiment of the invention is shown in FIG. 1 and described herein. FIG. 1 shows a communication system 8 which supports integrated exchange of asynchronous and synchronous data between a number of modules 10a, 10b, etc. The data exchanged between the modules includes data traffic from and to computers 18 and voice traffic from conventional telephone devices 20 and 22. The data traffic from and to the computers 18 can include all of the various types of data traffic conventionally generated by computers such as video data, pc-phone data, etc. The system shown in FIG. 1 establishes "virtual circuits" between modules 10 for telephone traffic (i.e. synchronous transfer) and to also manages exchange of asynchronous information transfer between modules 10.

As shown in FIG. 1 system 8 includes a collection of modules 10 organized in a ring architecture. Information travels from one module 10 to a successive module 10 as required. The information on the ring can be divided into three categories, namely, data packets, tokens, and control characters (including a timing character). As used herein the following terms have the following meaning.

A "byte" consists of ten bits. Eight data bits are coded into a ten bit byte. Since a ten bit byte is used to encode 8 bits of data, a byte can be decoded into 256 different data words plus 768 additional decodes. Some of the additional decodes are used to form control characters, a timing character, and tokens. Other ones of the additional decodes are used for purposes unrelated to the present invention. Such decoding is conventional.

A "control character" consists one byte. The specific byte that forms each control character is selected from the decodes which do not form data words. There are three control characters which are used to implement the present invention. One control character indicates the start of a window, a second indicates the end of synchronous data transfer, and the third indicates the end of a window. When a module receives a control character it immediately retransmits the character to the next module in the ring.

A "token" consists of two bytes of data. As with control characters, the specific bytes that form each token are selected from the decodes which are not otherwise assigned. When a module receives a token, it only retransmits the token to the next module if certain conditions have been met. There are two tokens used in the implementation of the present invention. One token indicates that a module should begin transmitting its synchronous data and the second indicates that a module should begin transmitting asynchronous data. A module only passes a token to the next module after a module that receives a token has completed the task initiated by the token.

A "timing character" consists of one byte. This one byte is selected from the decodes not otherwise assigned.

A "synchronous packet" consists of 16 bytes of data plus three bytes of address information.

A "asynchronous packet" consists of 64 to 1524 bytes of data plus an 8 byte Ethernet header.

As each module 10 receives bytes (i.e. information packets, control characters, and tokens) from its predecessor in the ring, the module copies the bytes it receives internally and retransmits the bytes to a successive module 10 if appropriate. Bytes thereby flow at high speed around the ring architecture from one module 10 to another module 10. It is noted that tokens are only transmitted from one module to another module when a task initiated by the token has been completed.

The ring architecture allows use of a variable number of modules 10. Four such modules 10, individually 10a–10d, are shown in the particular embodiment described herein. It will be understood, however, that more modules 10 may be inserted into the ring architecture or that some of modules 10a–10d may be removed from the ring architecture. Thus, modules 10 "stack" to meet use requirements, e.g., system 8 expands, to follow a growing user population or capacity requirement.

Each module 10 communicates with two adjacent modules through interconnecting communication links 12. Each of the links 12 is bi-directional. For example link 12a goes from module 10a to 10b and link 12ab goes from module 10b to module 10a. In normal operation the system uses links 12a, 12b,12c, and 12d. If one of these links is down (i.e. broken) the system automatically switches to links 12ab to 12da. Such use of a set of backup links is conventional.

Link 12a couples the output port 14a with the input port 16b of module 10b. Link 12b couples the output port 14b with the input port 16c of module 10c. Similarly, link 12c couples the output port 14c with the input port 16d of module 10d. Finally, link 12d couples the output port 14d with the input port 16a of module 10a. Each communication link 12 is a high-speed communication path. The capacity for links 12 is established depending on the number of modules 10 involved and the number of user devices attached to modules 10. In the specific embodiment shown herein communication links 12 operate at 300 Mbps.

Modules 10 handle both synchronous data packets and asynchronous data packets. The synchronous packets 25 are fixed-length 16 byte packets 25. The asynchronous packets are variable length packets 35. Each module 10 has a number of asynchronous ports 30 (designated 30a to 30d) coupled to an asynchronous data buffer 32 and a number of synchronous ports 34 (designated 34a to 34d) coupled to a synchronous data buffer 36. Computers 18 are connected to asynchronous data ports 30 and telephones 20 and 22 are connected to synchronous data ports 34.

Modules 10 are interconnected by links 12. Links 12 establish a combined synchronous and asynchronous message transmission data network whereby computers 18 may share resources and data and whereby telephone conversations may be conducted among the population of telephones 20 and 22.

Each module 10 has a timer 37 (individually identified as timers 37a to 37d) which controls the timing within the module. Each module also includes a conventional programmed RISC processor and an associated memory which store and execute the programming operations described below.

Each module also has a plurality of user devices connected thereto. As shown in FIG. 1, the user devices connected to the modules 10 include various computer work stations or terminals 18, analog telephones 20, and digital phones 22.

Figure 2:
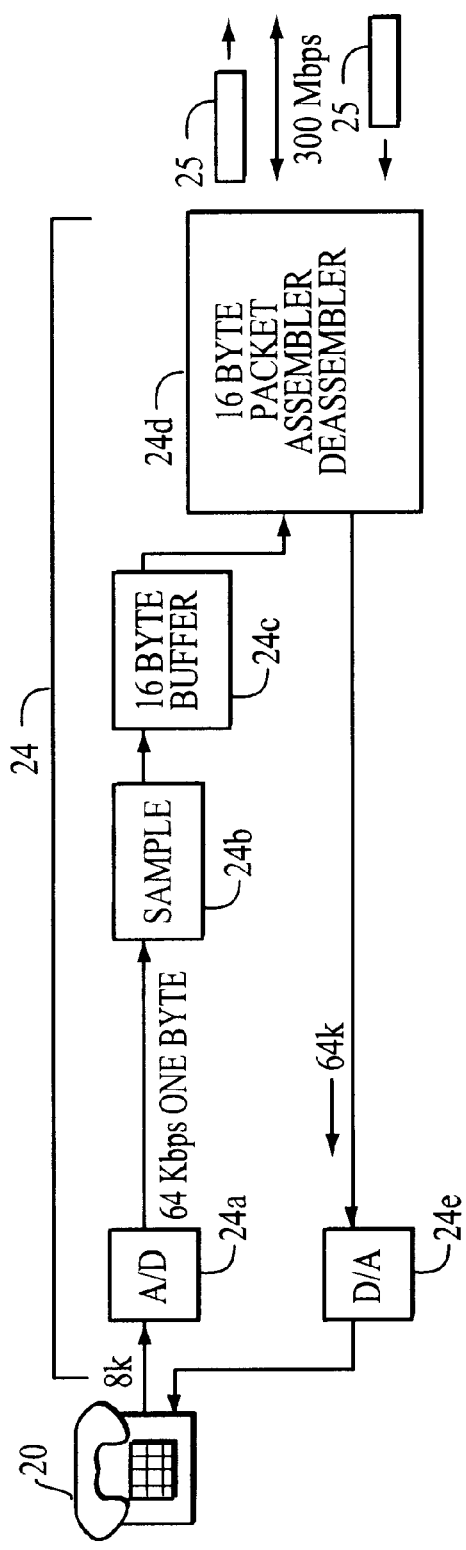
FIG. 2 is a diagram of the package assembler and disassembler (PAD) portion of the modules for coupling to analog telephone devices.

Each analog telephone 20 is connected to a packet assembler and disassembler (PAD) 24. FIG. 2 illustrates in more detail a PAD 24. A PAD includes an analog-to-digital converter 24a, a sampling circuit 24b, a packet buffer 24c, and a packet assembler and disassembler block 24d. Each PAD 24 produces a sequence of 16 byte packets 25 representing voice sampled from a corresponding analog telephone 20. Such a sequence of packets carry "one side" of a telephone conversation.

Each PAD 24 also receives a sequence of 16 byte packets 25 for audible presentation of voice at the corresponding analog telephone 20. Block 24d drives a digital-to-analog converter 24e with incoming packets 25, i.e., the "other side" of a telephone conversation involving a user and telephone 20. Thus, block 24d operates within a given module 10 providing and receiving packets 25 representing an analog telephone conversation and the associated normal in-band telephone signals. Packet 25 transport occurs at 64 kbps in order to support the full duplex telephone traffic.

Digital telephones 22 produce similar packets 25 representing one side of a telephone conversation, i.e., voice sampled by digital telephone 22, and also receive a sequence of packets 25 for audible presentation at a digital telephone 22. Digital telephones 22 exchange packets 25 with a module 10 at sufficient speed to support a full duplex telephone conversation, i.e., 64 kbps.

Telephone conversation data from telephones 20 and 22 is packetized in the fixed-length 16 byte packets 25. The packets containing voice data must be delivered in a timely manner in order to maintain acceptable quality of voice communication. In order to accomplish timely delivery of data representing voice communications, all such data is handled by the present invention in a synchronous fashion. Since such data is handled in synchronous fashion conventional "virtual circuits" can be established between user devices, e.g., between members of the population of telephones 20 and 22. High quality telephone connections can therefore be achieved. There is no perceptible degradation in voice quality, because no more than about a four and a half millisecond delay exists in delivery of any given packet 25 from end terminal to end terminal (i.e. from telephone to telephone).

Computer work stations 18 produce data for delivery to other stations 18 and receive data from other stations 18. Because variation in delay and variation in packet size is generally acceptably in communications between stations 18, such data is managed in an asynchronous fashion when transported via modules 10. Information exchanged among stations 18 is divided into "Ethernet" type packets, i.e., variable sized packets including addressing information according to an Ethernet type addressing schemes.

Figure 3:
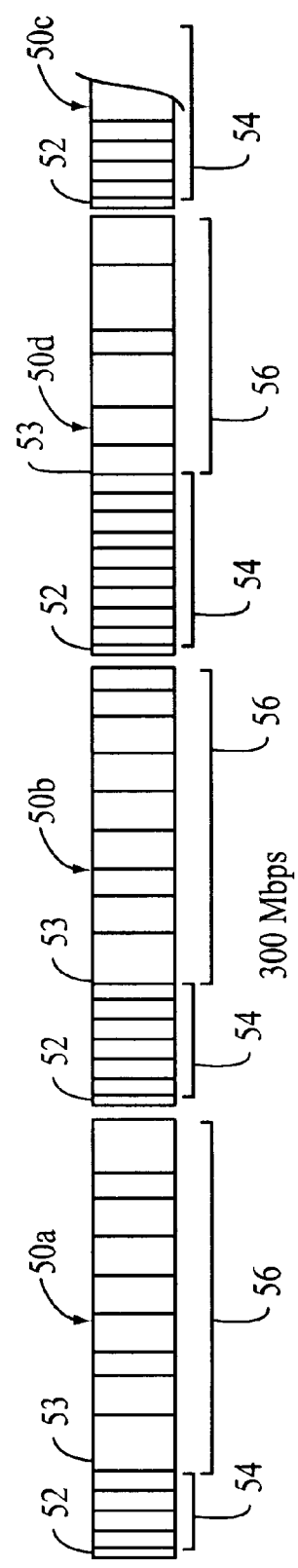
FIG. 3 shows a repeating sequence of fixed-length time windows used in allocating data traffic between the modules of FIG. 1.

The time frame for communication on links 12 is divided into a sequence of windows. FIG. 3 illustrates a sequence of windows 50, individually identified as windows 50a, 50b, etc. Each window 50 is two millisecond long Each window 50 begins with a "start window" control character or field 52 (which is one byte long). The start window control character indicates the onset of a window 50. The remainder of each window 50 is dedicated first to all pending synchronous data transmissions and then to asynchronous data transmissions. More particularly, a first portion 54 of each window 50 is dedicated to exchange of all pending synchronous data packets 25. After all pending synchronous data packets 25 have been exchanged among modules 10, a second control character (not explicitly shown in FIG. 3) is transmitted around the ring to indicate the end of the synchronous transmissions. A second portion 56 of each window 50 is dedicated to exchange of asynchronous data packets 35. At the end of each window another control character (not explicitly shown in FIG. 3) is transmitted around the ring. As will be explained later, tokens and timing characters are also transmitted around the ring.

The length of window 50 is two milliseconds long. The length of windows 50 is established by taking into account the bandwidth of the various communication paths. The length of window 50 is established so that all synchronous data can be delivered during each window and so that after the synchronous data is transmitted, sufficient reserve will remain in each window 50 to conduct exchange of asynchronous data. The actual allocation of a given window 50 between synchronous and asynchronous data is dynamic. The allocation depends on the amount of pending synchronous data packets 25 which must be transmitted during the first portion of a given window 50. As the number of telephone conversations increases, the portion 54 of window 50 used for such conversations increases.

Thus the allocation between synchronous and asynchronous data in a given window 50 is not fixed but rather a function of the amount of synchronous data pending at the beginning of the window 50 with the remaining portion 56 being used for asynchronous data. A control character 53 which indicates that synchronous traffic is "all done" separates portions 54 and 56 of each window. This control character indicates the end of synchronous data transmission and the beginning of asynchronous data transmission within a given window 50.

Figure 4:
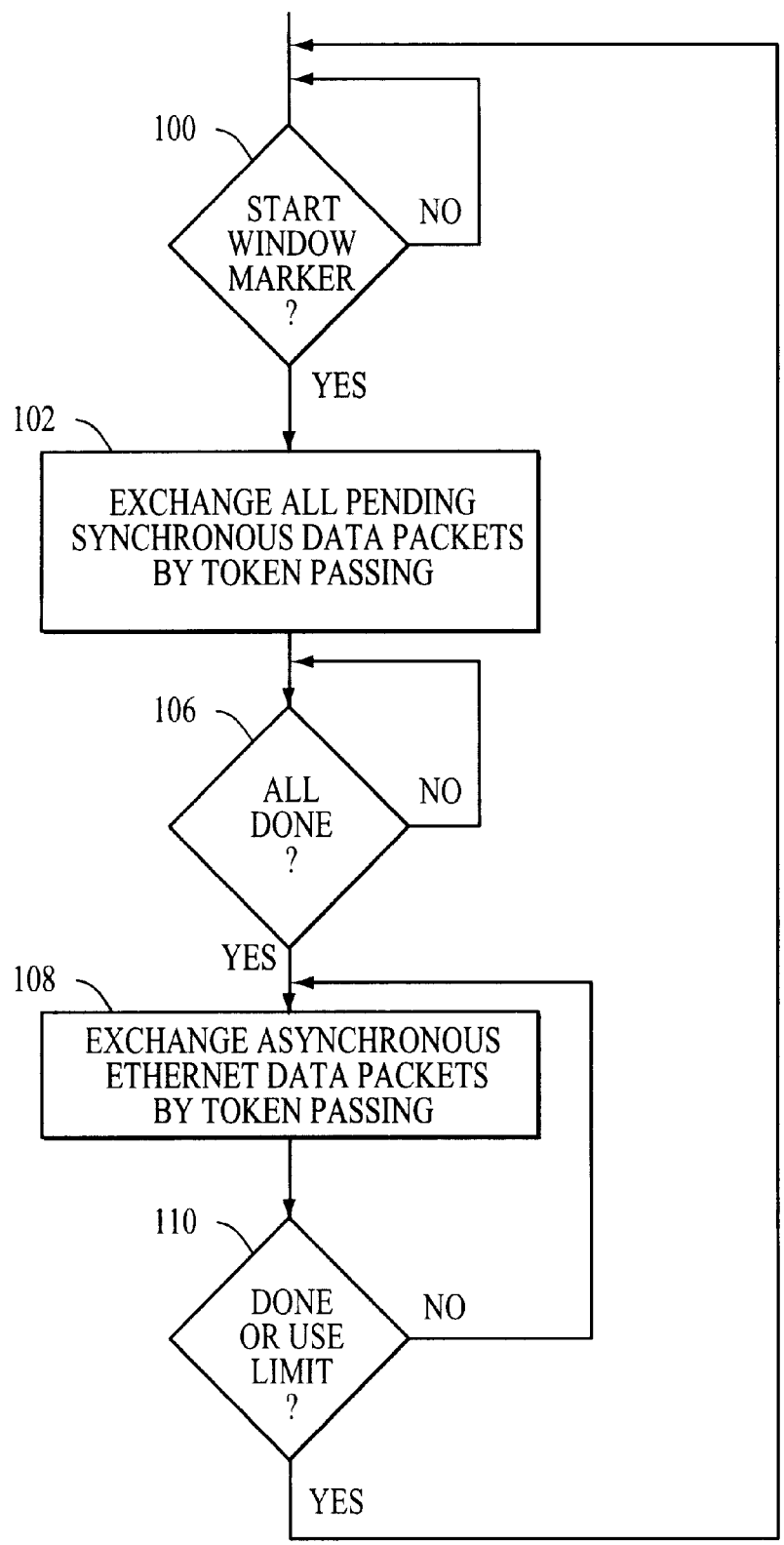
FIG. 4 is a system-level flow chart illustrating overall operation of the communication system of FIG. 1.

FIG. 4 illustrates, at a system level, data exchange during a given window 50. As shown in FIG. 4, processing loops at decision block 100 until start window control character 52 appears on links 12. Processing then advances to block 102 where modules 10 exchange all pending synchronous data packets, i.e., deliver all pending packets 25 in the synchronous data buffers 36. Block 102 represents the overall exchange of all pending synchronous data packets 25 among modules 10a–10d by ring message exchange.

As indicated by decision block 106 a determination is made that all modules 10 have completed exchange of pending synchronous data, e.g., all modules 10 have delivered all pending synchronous data packets 25. In other words, all synchronous data in buffers 36 at the onset of the current window 50 have been transmitted via links 12 to an appropriate module 10. At this point, communication among modules 10 switches from a synchronous mode of operation to an asynchronous mode of operation allowing variable length packets and an alternate addressing scheme. Asynchronous transmission is done using Ethernet packet rules and addressing codes to route the variable length packets to particular modules 10 and to corresponding user devices attached thereto. Ethernet packaging rules allow packets of varying length between 64 and 1524 bytes To prevent monopolization of window 50 by one module, each module 10 limits its use of portion 56 of each window so as to allow other modules 10 to deliver asynchronous data. Thus, block 108 represents delivery of a limited amount of asynchronous packets followed in decision block 110 which tests use limitations. During block 108, a module 10 sends a certain number of Ethernet packets to a successive one of modules 10. Such module 10 limits its further use of the asynchronous portion 56 of a given window 50. That is, each module 10 is allowed a limited number of asynchronous data bytes per given window 50. In the embodiment described herein, each module 10 transmits a maximum of 4000 bytes of asynchronous data in any given window 50. Thus, system level operation loops at blocks 108 and 110 until all modules 10 have reached their use limit for the current window 50 or have delivered all pending asynchronous data. Processing eventually returns to block 100 where system 8 waits for occurrence of the start window control character 52 and a next window 50.

The modules 10 in general operate on a "peer" basis. However, one of modules 10 is given some degree of control over the process. In the embodiment shown, module 10a executes master control, that is, to some extent module 10a orchestrates the exchange of information on links 12 and it is in effect a timing master for the system. Modules 10 other than module 10a may be inserted and removed from the system as needed or desired without corrupting an overall control strategy, However, there must always be a control module 10a.

Master control module 10a makes use of control characters and tokens to orchestrate packetized information exchange within system 8. Modules detect the receipt of a token or control character by detecting one of the decodes of a byte other than the 256 data decodes. When a module 10 receives a control character or a timing character, it immediately retransmits the control character or timing character to the next module 10. When a module 10 receives a token, the token is held until the module 10 is ready to retransmit the token, i.e. until the module is ready to relinquish its right to send packets of a particular type.

Figure 5:
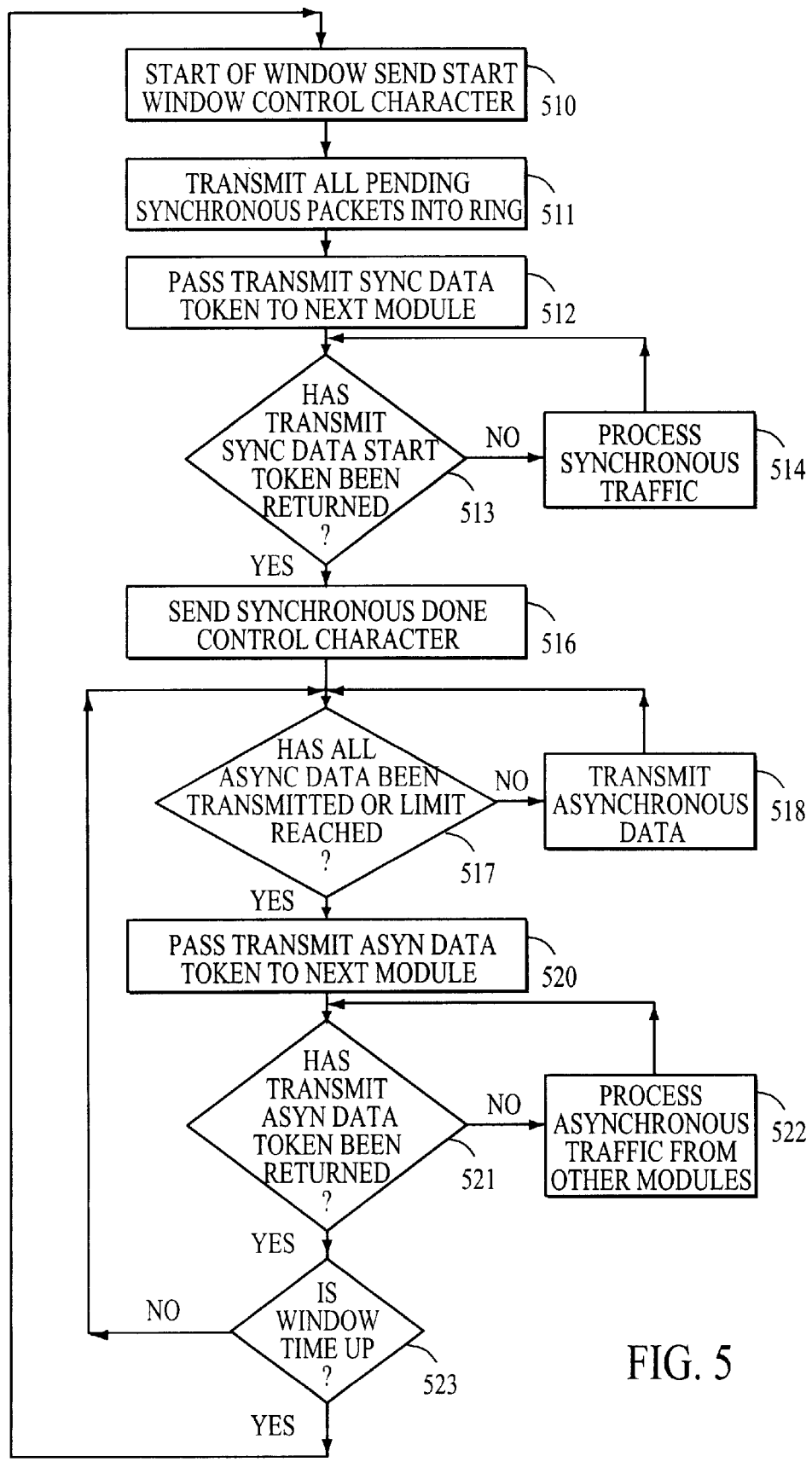
FIG. 5 is a program flow chart showing the operation of the module which executes certain control among the modules of FIG. 1.

FIG. 5 illustrates programming with respect to operation of module 10a. Module 10a is the master control module. As indicated by block 510, the process begins when module 10a transmits a "window start" control character 52 (see FIG. 3). Control character 52 is sent immediately around the ring architecture because when a module 10 receives a control character it immediately re-transmit (i.e. repeats) the control character. At this point, all modules 10 are prepared for the onset of a window 50. As indicated by block 511 module 10a transmits all its pending synchronous packets 25, i.e., module 10a empties synchronous data buffer 36a, into the ring on communication link 12a. Once module 10a has transmitted all of its synchronous data packets 25, as indicated by block 512 module 10a passes the "transmit synchronous packets" token to the next module, i.e., to module 10b.

After passing the transmit synchronous packets token to the next module on the ring, module 10a processes synchronous packet traffic from other modules until the transmit synchronous packets token is returned to module 10a. This is indicated by blocks 513 and 514. During this time, the remaining modules 10 will each in turn have opportunity to send all synchronous data packets 25 which were pending at the onset of the current window 50. That is, after module 10b receives the token, it transmits all its pending synchronous data packets 25, i.e., empties synchronous data buffer 36b, onto link 12b. Module 10b then passes the token to module 10c, giving module 10c an opportunity to send all its synchronous data packets 25 onto link 12c. The token is then passed to module 10d. When module 10d receives the token, it in turn submits all its synchronous data packets 25 which were pending at the onset of the current window 50 onto link 12d. As each module 10 submits its synchronous data packets 25 onto the ring architecture, each packet 25 reaches a target or module 10 which has attached thereto one of telephones 20 or 22 so as to complete a virtual circuit.

Eventually, all modules 10 will have had an opportunity to submit synchronous data packets 25 onto the ring and the "transmit synchronous packets" token will return to module 10a. Processing then advances from decision block 513 to block 516 and module 10a sends the "all done synchronous data" control character 53 out on link 12a. Each of modules 10b–10d thereby receive the "all done synchronous data" control character 53 indicating a transition from synchronous data exchange to asynchronous data exchange. As indicated by blocks 517 and 518, module 10a transmits asynchronous data packets 35 onto link 12a. As may be appreciated, each of the asynchronous data packets pass around the ring and eventually reach the intended destination, i.e., one of modules 10b–10d addressed as the destination address in the packet.

Module 10a stops sending asynchronous data packets when one of two conditions is satisfied as indicated by decision block 517. Transmission of asynchronous packets by module 10a stops when module 10a determines that it has no more asynchronous data to transmit, (i.e., asynchronous data buffer 32a is empty) or if module 10a has reached its use limit. In defined a module is limited to transmitting 4000 bytes in one session. If module 10a has not reached its use limit and if there are additional asynchronous data packets 35 in buffer 32a, then processing returns to block 518 and module 10a continues to transmit asynchronous data packets Eventually, module 10a either reaches its use limit or exhausts pending asynchronous data in buffer 32a. Processing then advances to block 520 and module 10a passes the token to the next module, i.e., to module 10b.

After passing the token to the next module, module 10a will process asynchronous data traffic as indicated by blocks 521 and 522. Module 10a checks for return of the token as indicated by decision block 421. That is processing as indicated by blocks 521 and 522 continues until the token is returned to module 10a. When the token returns to module 10a, all modules 10 have had opportunity to send asynchronous data packets 35 onto the ring at least once up to their given limit, i.e., at least 4000 bytes.

At this point, some portion of window 50 may remain. This is determined as indicated by block 523. If more time remains module 10a can take advantage of this opportunity to send more asynchronous data packets 35. As indicated in FIG. 5 The "no" output from block 523 goes back to block 517 and the process repeats.

Eventually, module 10a runs out of time in the current window 50 for transmission of additional packets 35. An end of ring control character is then transmitted around the ring. Processing then returns to block 510 where module 10a again sends control character 52 and the process repeats.

Module 10a also provides a timing reference for the system. Module 10a includes an interval timer 37a which produces interrupt signal every 15.625 microseconds. This timing reference signal is transmitted from module 10a to the other modules in the ring. When the timing interrupt occurs, module 10a transmits the special timing control character. The timing control character is inserted into any packet that is being transmitted at the time the interrupt occurs. Thus, some synchronous packets 25 may be 17 bytes long after the clock control character is inserted therein. The additional delay introduced, i.e., a 16 byte synchronous packet 25 versus a 17 byte synchronous packet 25, does not introduce any noticeable delay to persons engaged in a conversation. The timing character is a 10 bit character which is not used for any other purpose and which each units recognizes as a timing character. When a unit on the ring (other than module 10a) detects this character, it repeats the character to the next unit on the ring and at the same time it re-synchronizes its internal clock 37. That is, the clock 37 in each unit is re-synchronized when the timing character is detected. In this way the clocks 37 in the various modules are kept in close synchronization. It is noted that as shown herein it is the control module 10a which introduces the timing character onto the ring, any one of the modules could perform this function.

Figure 6:
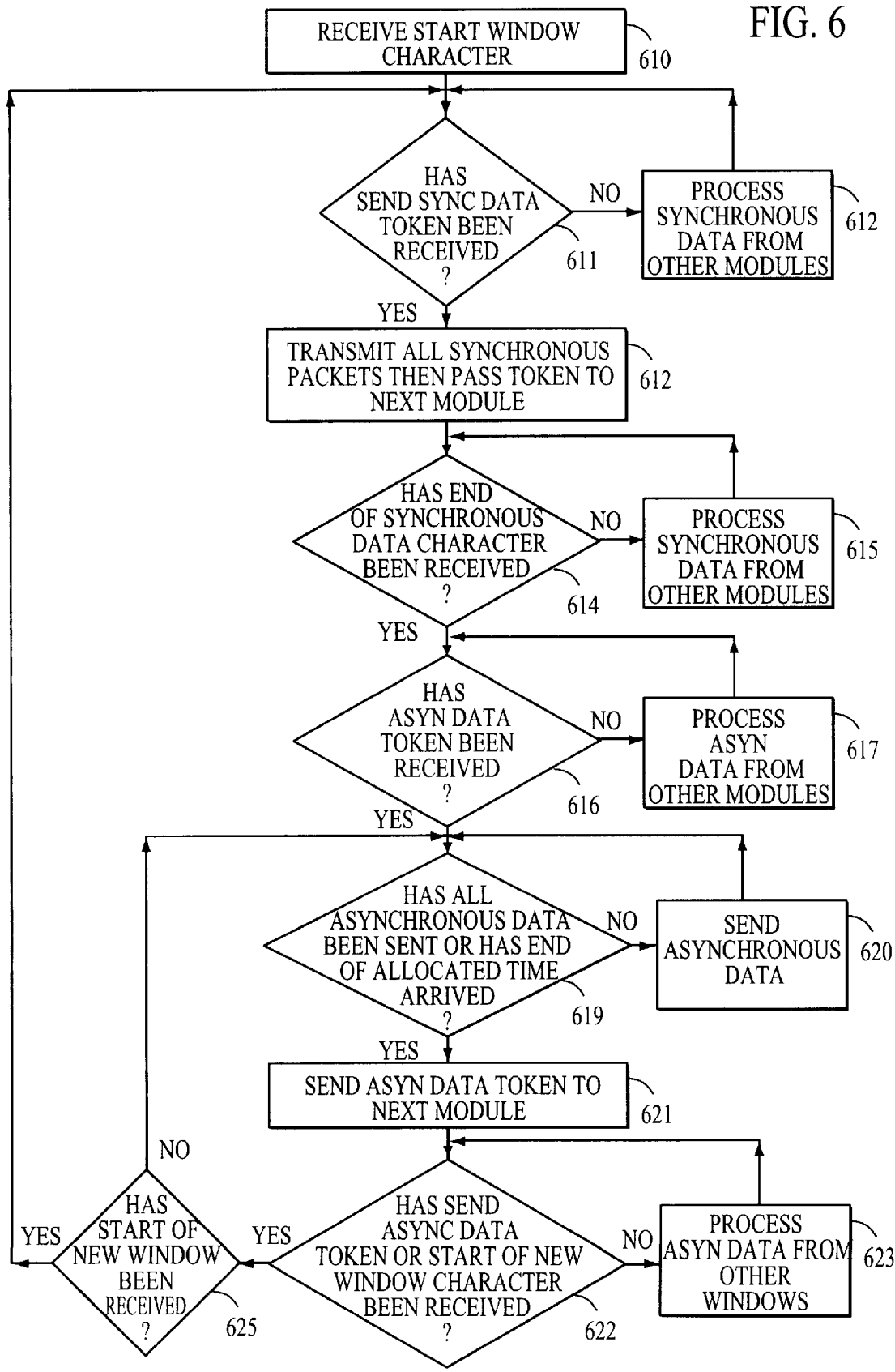

FIG. 6 illustrates the programming for modules 10 other than module 10a. (FIG. 5 shows the programming for module 10a). That is, FIG. 6 illustrates programming for modules 10b–10d. The process starts as indicated by block 610 when a module receives a "start window" control character 52. After receiving a "start window" control character a module looks for a token with indicates that the module should start transmitting synchronous data. Processing continues iteration between blocks 611 and 612 until the module 10 receives the "start transmitting synchronous data" token. As indicated by block 611, when a module receives the "start transmitting synchronous data" token the module begins transmission of its synchronous data. Once a module 10 has transmitted all pending synchronous data packets 25 into the ring, it passes the "start transmitting synchronous data" token to the next module 10. This gives the next module 10 opportunity to submit its synchronous data packets 25.

Once a module 10 has passed the "start transmitting synchronous data" the module processes synchronous packet traffic from other modules as indicated by block 615. Decision block 614 indicates that a module looks for "all synchronous traffic done" control character 53. Until the "all synchronous traffic done" control character 53 appears, processing iterates at blocks 614 and 615 and the module processes any synchronous data packets 25 appearing in the ring architecture from other modules. When the "all synchronous traffic done" control character 53 does appear processing advances to block 616 and 617 where the module processes any asynchronous packet traffic appearing in the ring architecture from other modules. In decision block 616, module 10 looks for the "send asynchronous data" token. Processing iterates at blocks 616 and 617 until the module receives the "send asynchronous data" token. "send asynchronous data" token is received asynchronous data packet 35 are transmitted as indicted by block 620. After transmitting each asynchronous data packet 35, the module determines as indicated by block 619 whether it has any additional asynchronous data packets to transmit, or if the module has reached its use limit, e.g., has transmitted 4000 bytes of asynchronous information in the current window 50. Processing iterates at blocks 619 and 620 until no further asynchronous data packets remain or until the module 10 has reached its allotment or use limit allowed in the current window 50. Processing then advances to block 621 and the module passes the "send asynchronous data" token to the next module 10.

After each of the modules 10 has had an opportunity to transmit both synchronous and asynchronous traffic during a particular window, there may still be time remaining in the window. When this condition occurs, the modules are given another chance to transmit additional asynchronous packets. This condition is illustrated in FIG. 6 by the path from block 622 through block 625 to the entry of block 619.

Following block 621, processing iterates between blocks 622 and 623 where the module processes any further asynchronous packet traffic from other modules and looks for the occurrence of the end of window and the start new window control characters. If an end of window and start of new window control characters have not been received the processing goes from block 622 to 625 to 619. When and end of window and start of new window control characters are received the processing returns to block 611.

As an example of the capacity of the system, it is noted that a voice switching capacity on the order of 256 simultaneous, full duplex calls may be implemented on a stack of eight modules 10. Each full duplex voice call consumes 64 kbps of data bandwidth. This translates into: (64,000*2)*256=32,768,000 or 32 Megabits (Mbps) of voice switching bandwidth on links 12 to support 256 simultaneous full duplex voice calls. This is exclusive of framing overhead, which will be dependent on the hardware implementation.

There are also other capacity considerations. Services which use 'redirection', e.g., voice compression, voice recognition or fax services, all are very processor bandwidth intensive. This component creates an 'overhead factor' on the base voice switching bandwidth independent of framing overhead. Using an estimated overhead factor of thirty-three percent, the voice switching bandwidth requirement increases from about 32 Mbps to about 44 Mbps.

For asynchronous data capacity, a minimum carrying requirement of a single 100 Mbps Ethernet will meet a given level of computer network use expectations. This brings the aggregate carrying capacity for system 8 to about 144 Mbps.

For control and management an overhead of not more than about 4 Mbps per module 10 is expected. Of this, 1 Mbps is reserved for true inter-module 10 communication, 0.5 Mbps is reserved for network management, 1.5 Mbps is reserved for call accounting and 1 Mbps is reserved for event logging and tracing. For eight modules 10 in a system 8, a subtotal of (8*4,000,000) or about 32 Mbps. This brings the entire switching capacity requirement for system 8 to about 176 Mbps. Establishing a 300 Mbps capacity for links 12 supports this expected switching capacity.

Naturally, other systems could be implemented using the present invention with different requirements and capacity considerations. For example various numbers of modules 10 could be connected in a ring utilizing the present invention, While the invention is described as applied to a LAN environment, it is noted that the invention could also be applied in a WAN environment. It is also noted that the communication path between modules 10 could be either electrical or optical without departing from the present invention.

It should be appreciated that the computer data communicated between modules 10, could include all the various kinks of data normally transmitted between computer. For example such data could include video data and PC-telephone data.

A combined synchronous and asynchronous message transmission method and apparatus has been shown and described. The integration of synchronous and asynchronous message transmission into a single communication system provides opportunity for integrated communication services incorporating both computer data and voice data. Despite integration of synchronous and asynchronous data, synchronous data arrives in timely fashion without degradation in voice quality.

As described herein data from computer 18 is treated as asynchronous data. However, under certain conditions, computers 18 may be required to deliver time-sensitive information in a synchronous manner, and could be treated as such by a corresponding module 10.

System 8 also includes an external connection 38, e.g., a high speed telephone or network connection, whereby other systems may introduce information into system 8 or take information from system 8. Such links are handled similar to links directly connected to modules 10.

It is noted herein that a single asynchronous protocol is used. However, additional control schemes may also be employed. For example such protocols could be used to allow further exchange of asynchronous data when modules 10 have reached their use limit for asynchronous data, but window 50 has not yet expired.

It will be appreciated that the present invention is not restricted to the particular embodiment that has been described and illustrated, and that variations may be made therein without departing from the scope of the invention as found in the appended claims and equivalents thereof.

What is claimed is:

1. A communication system comprising:

a plurality of communication modules interconnected to exchange information there between, said information including a variable amount of synchronous information and a variable amount of asynchronous information, said modules providing and receiving said synchronous information in substantially fixed length packets, said modules providing and receiving said asynchronous information in variable length packets, each of said packets comprising a plurality of multi bit bytes;

a communication channel coupling said modules together, operation of said communication channel being divided into repeated fixed length windows, said channel operating in accordance with a token passing protocol, each module transmitting a variable number of fixed length packets between said modules during a first portion of each of said fixed length windows and each module transmitting a variable number of variable length packets between said modules during a second portion of each of said repeated fixed length windows, each module transmitting a token to the next module when that module has completed the transmission of all synchronous packets from that module to other modules, in order to indicate that the next module can begin transmission of synchronous packets, and a timer which periodically inserts a timing byte into the string of bytes being transmitted between said modules on said communication channel, each of said modules including a timer which is resynchronized in accordance with said timing byte.

2. A system for transmitting synchronous and asynchronous information, said system comprising:

a plurality of modules coupled in a ring, each module receiving input from a predecessor module and providing output to a successor module, each of said modules referencing a repeating sequence of time windows, each time window including a first portion dedicated to exchange of synchronous data and a second portion dedicated to exchange of asynchronous data, said ring operating in accordance with to a token passing protocol, said synchronous data being in the form of fixed length packets and said asynchronous data being in the form of variable length packets, said first portion of said time window terminating when all pending synchronous data has been exchanged among said plurality of modules, each module transmitting a token to the next ring when it is completed transmitting all synchronous data pending in that module, use of said second portion of said time window by each module being limited whereby each of said modules has opportunity during said second portion of said window to transmit some asynchronous data, each module including a clock, synchronization between said modules being maintained by periodically transmitting a character on said ring which is recognized by each module as a timing character and wherein each modules resynchronizes its clock when said character is received.

* * * * *